United States Patent

[11] 3,587,203

[72] Inventor Francis E. Miles
 Incline Village, Nev.
[21] Appl. No. 769,618
[22] Filed Oct. 22, 1968
[45] Patented June 28, 1971

[54] APPARATUS FOR PREPARING SALAD MIXES
 5 Claims, 9 Drawing Figs.
[52] U.S. Cl. ........................................ 53/112,
 99/100, 99/189, 146/78, 146/222
[51] Int. Cl. ........................................ B65b 31/00,
 A23l 1/00
[50] Field of Search ........................................ 146/78, 81,
 52, 222; 99/168, 171, 234; 53/112, 123

[56] References Cited
UNITED STATES PATENTS
2,688,993 9/1954 White ........................... 146/52
3,463,211 8/1969 Holz ............................. 146/78

Primary Examiner—Willie G. Abercrombie
Attorneys—Clarence A. O'Brien and Harvey B. Jacobson ABSTRACT: A means for the preparation of a tossed salad mix from salad greens wherein the salad greens are severed into segments, washed, drained, and inert atmosphere packaged in a manner whereby oxidative discoloration of the segments is eliminated, i.e., retarded for a sufficient period of time, to render it economically feasible to provide restaurants and other food service facilities with a salad green mix which is ready for serving.

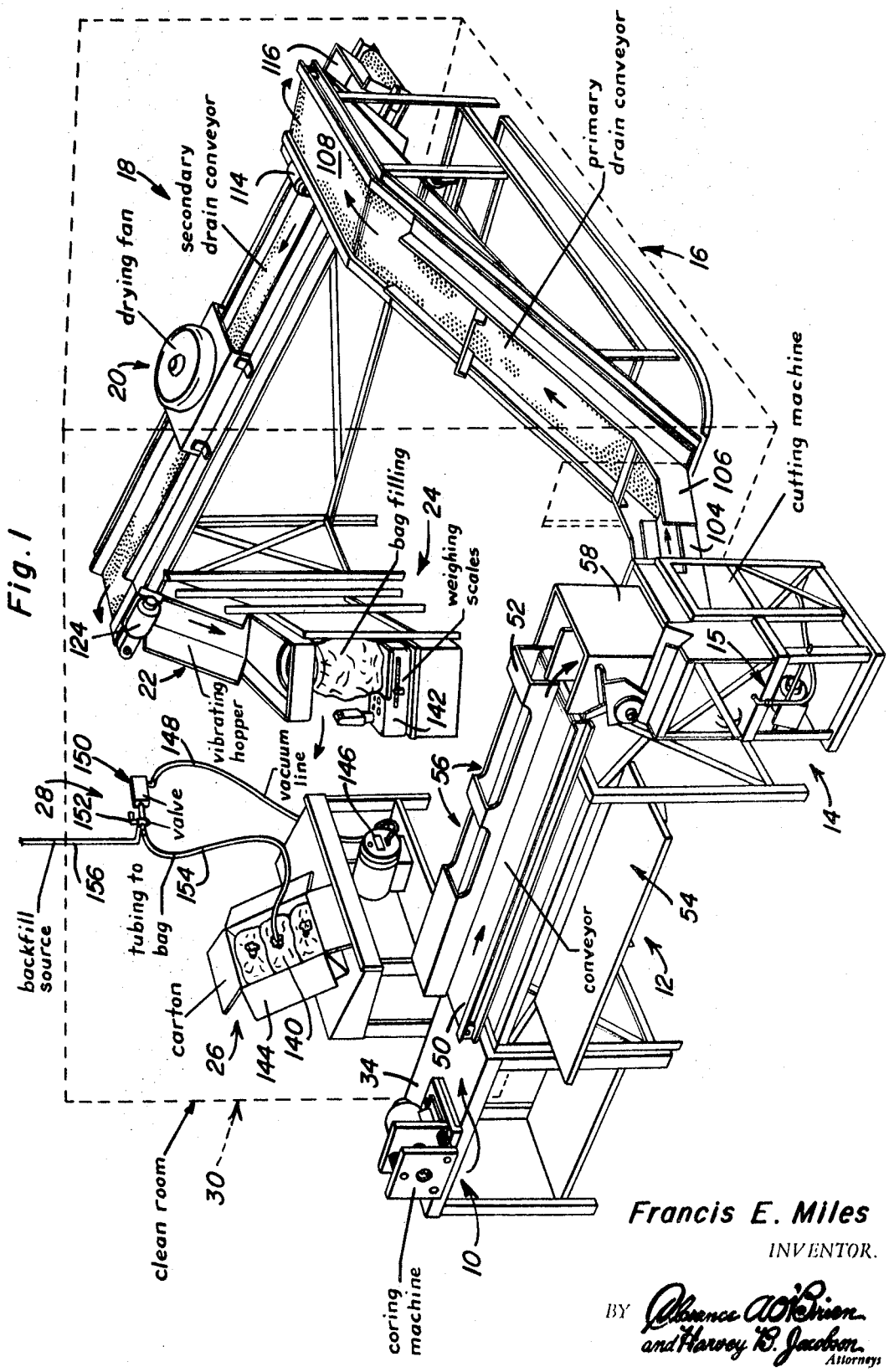

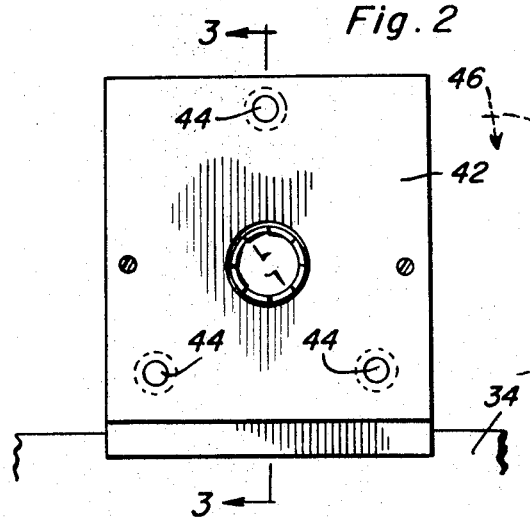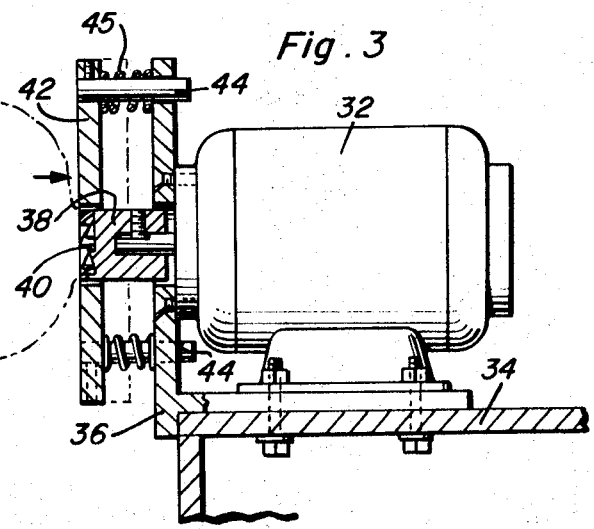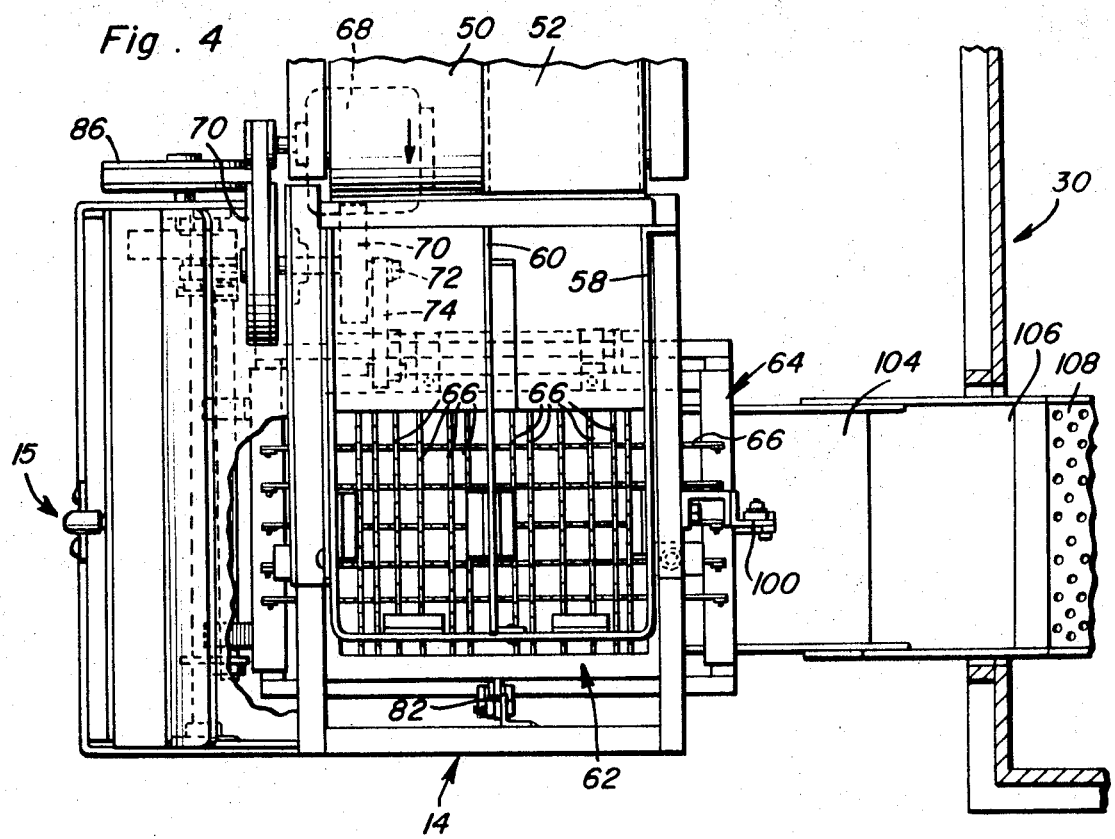
Francis E. Miles
INVENTOR.

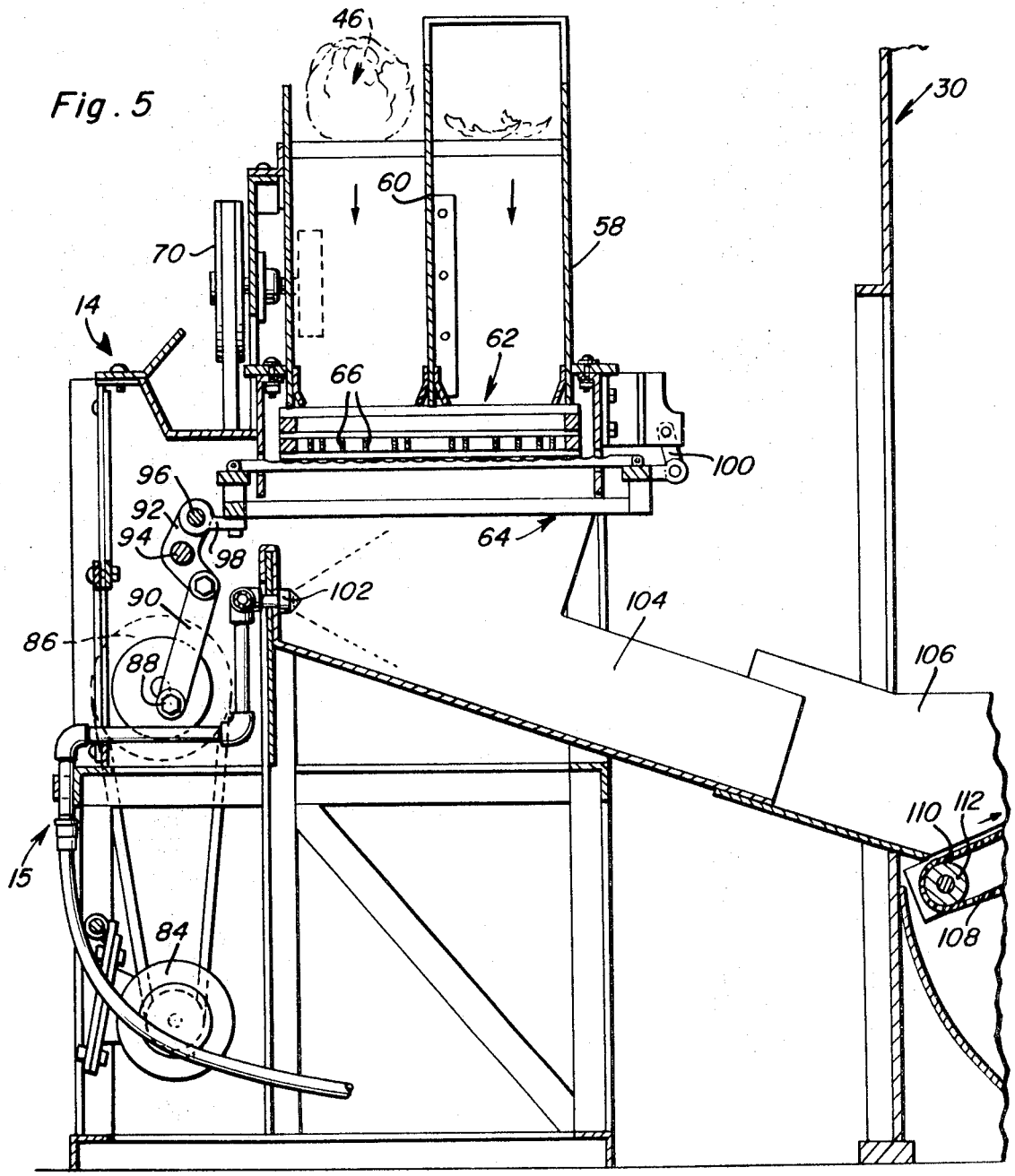
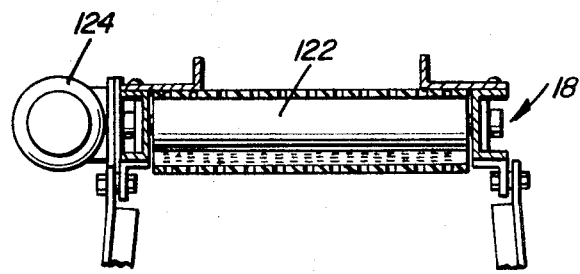

Francis E. Miles
INVENTOR

APPARATUS FOR PREPARING SALAD MIXES

The present invention relates to the processing of highly perishable vegetables for the preparation of a convenience type food product particularly suited for restaurant and institutional food service use. More particularly, the present invention relates to a process and apparatus for the preparation of a tossed salad mix from salad greens whereby it is rendered economically feasible to provide restaurants and other food service facilities with a salad green mix which is ready for serving.

It is a primary object of the present invention to provide a commercially feasible process for the trimming, segmenting, mixing, washing and inert atmosphere packaging of salad greens for the preparation of a ready-to-use salad mix for the serving of tossed salad.

Another object of the present invention is to provide a novel apparatus for implementing the aforestated object whereby a ready-to-use salad green mix can be prepared in commercial quantities in a manner whereby oxidative discoloration of severed segments comprising the salad green mix is delayed for a sufficient period of time to permit the prepared mix to be handled through normal food distribution channels for the distribution of the mix to restaurants and other food service facilities.

A further object of the present invention is to provide novel-processing apparatus for severing salad greens into "bite-size" segments, of a size range normally encountered in tossed salad, while imparting to the segments the appearance of having been manually cut or torn, as is considered most desirable in the preparation of salad greens for tossed salad.

These together with other objects and advantages which will become subsequently apparent reside in the details of the process as well as the construction and operation of the apparatus as more fully hereinafter described and claimed, reference being had to the accompanying drawings forming a part hereof, wherein like numerals refer to like numerals refer to like parts throughout, and in which:

FIG. 1 is a perspective view of the processing apparatus utilized in preparing salad vegetables in accordance with the process of the present invention;

FIG. 2 is a front elevational view of a motor-operated coring device comprising a portion of the apparatus of FIG. 1;

FIG. 3 is a vertical cross-sectional view of the coring device of FIG. 2 taken substantially along the plane of the line 3-3 of FIG. 2;

FIG. 4 is a top elevational view of a cutter device comprising a portion of the apparatus of FIG. 2 for severing salad greens into bite size segments;

FIG. 5 is a front elevational view of the cutting device of FIG. 4;

FIG. 8 is a transverse, generally vertical, cross-sectional view of the secondary drain conveyor taken substantially along the plane of the line 8-8 of FIG. 7.

Figure 6:
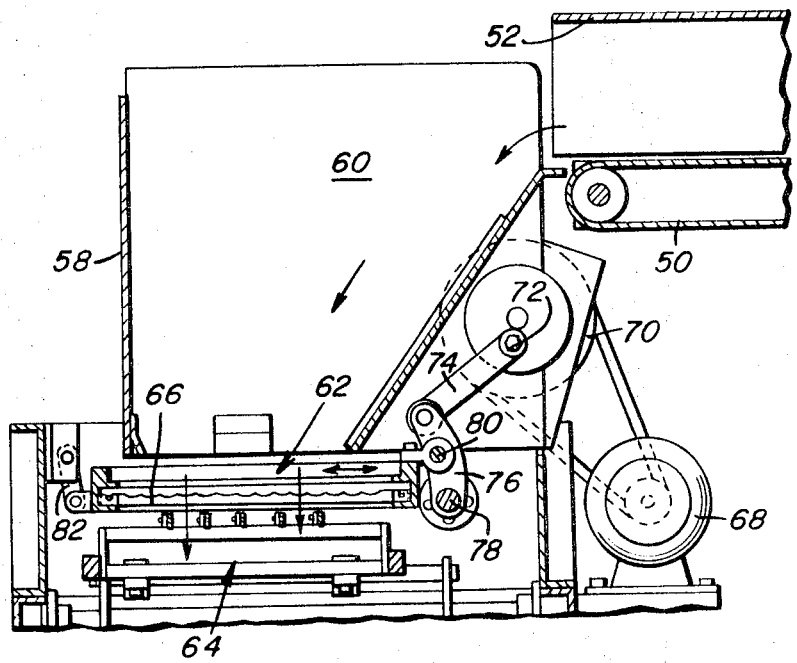
FIG. 6 is a fragmentary vertical cross-sectional view of the cutting device of FIGS. 4 and 5.

Referring now to the drawings in greater detail, and FIG. 1 in particular, it will be seen that the exemplary embodiment of salad green processing apparatus constructed in accordance with the present invention basically comprises a coring machine 10, conveyor means 12 for conveying cored salad vegetables to a cutting machine 14 for severing of the salad greens into bite size segments. The cutting machine 14 has associated therewith spray wash means indicated generally at 15 for spray washing salad vegetable segments discharging from the cutting means of the cutting machine 14. A primary drain conveyor 16 is provided for initiating drainage of the washed segments of the salad greens, which primary drain conveyor 16 discharges the partially drained washed salad vegetable segments onto a secondary drain conveyor 18 provided with a drying fan indicated generally at 20 to insure that excess undesirable water is removed from the surface of the salad vegetable segments. The washed and dried salad vegetable segments discharging from the secondary drain conveyor 18 are deposited on a vibrating hopper means 22 for the purpose of further removing excess moisture from the salad vegetable segments prior to advancement of the segments to a bag filling means 24 where the washed and dried salad vegetable segments are weighed into a receptacle, such as a generally impermeable bag of plastic material, capable of being hermetically sealed. A plurality of filled bags from the bag filling means 24 are placed in a suitable master carton as indicated generally at 26 and by means of the evacuating and bag filling means 28 initially have the major proportion of interstitial air removed from between the salad vegetable segments followed by backfilling of the interstitial space with an inert gas, i.e., nitrogen, followed by sealing of the plastic bag. As indicated schematically by the enclosure defined by the broken lines in FIG. 1 the means 16, 18, 20, 22, 24 and 28 are situated in a clean room 30 wherein washed segmented salad vegetables being deposited on the primary drain conveyor 16 are processed within the clean room 30 to preclude recontamination of the washed segmented salad greens so as to insure that under inert-atmosphere packaging the salad greens will be further protected against undue deterioration.

Turning now to a more detailed description of the processing apparatus illustrated in FIG. 1, and particularly the coring machine 10, as illustrated in greater detail in FIGS. 2 and 3, it will be seen that the coring machine 10 includes an electric motor 32 rigidly secured to a worktable 34 and having secured thereto a combined face and mounting plate 36. The output shaft of the motor 32 is provided with an annular coring cutter 38 nonrotatably secured thereto by suitable lock means. As seen best in FIG. 3 the annular coring cutter 38 is provided with a plurality of axially disposed radially spaced cutter teeth as at 40. The coring machine 10 further includes a spring-loaded guard and guide pressure plate 42 having a plurality of guide pins 44 rigidly secured thereto which pins are slidably received in complementary apertures in the face plate portion of the member 36. The plate 42 is biased into the full line position, in FIG. 3, by helical springs 45 received about the pins 44 and held captive between the plates 42 and 36. Although not shown, it will be understood that the ends of the pins 44, distal to the plate 42, are provided with suitable detent means, i.e., cotter pin, so that the pins 44 cannot inadvertently drop out of the complementary apertures in the plate 36. As seen in FIG. 3, the core end of a head of lettuce 46 is schematically shown in broken line and it will be appreciated that upon energization of the motor 32 and urging of the head of lettuce 46 against the guard plate 42, that upon continued pressure the plate 42 will be urged to the right so as to uncover the annular coring cutter 38 whereby the core will be removed from the lettuce 46. Upon withdrawal of the cored head of lettuce the core previously retained within the annular coring cutter 38 is thrown clear and the pressure plate 42, under the influence of the springs about the post 44 returns to the full line position at which point the coring machine 10 is ready for the coring of another head of lettuce. The cored lettuce and/or salad greens other than those requiring coring, i.e., romaine lettuce, have their guard leaves removed, are trimmed, and butted by manual operation and then placed on the conveyor means 12 which includes an endless belt 50 continuously driven by motor means, not shown. A guard member 52 effectively divides the conveyor belt 50 into two runs whereby head lettuce, chicory, etc., which has been cored by the coring machine 10 is placed on the open run and lettuce such as romaine, etc. which has been manually trimmed, such a preferably on the trimming board 54, is placed through one of the elongated apertures 56 in the top of the guard member 52. Salad greens being conveyed in the direction of the arrow as seen best in FIG. 1, by the conveyor belt 50 are delivered to the feed hopper 58 of the cutting machine 14.

As seen best in FIGS. 4, 5 and 6 the feed hopper 58 is of downwardly opening rectangular funnel configuration and is provided with a centrally disposed vertical divider 60 for maintaining the infeed from the two runs of the conveyor separated prior to their being acted upon the cutting means of the cutting machine 14. The cutting means of the cutting machine 14 includes an upper cutter assembly indicated at 62 and a lower cutter assembly indicated at 64, each of which includes a plurality of parallelly disposed cutter blades 66 mounted on a peripheral frame means thereof for reciprocation of the blades. Thus, the blades within the assemblies 62 and 64 are at right angles to one another on horizontal planes slightly vertically spaced, as seen best in FIGS. 5 and 6. The upper cutter assembly 62 is reciprocated in a direction parallel to the longitudinal axis of the conveyor 50 by means of a drive motor 68 driving a flywheel 70 provided with an eccentrically disposed wrist pin 72, as seen best in FIG. 6, which by means of crank 74 effects oscillation of a lever 76 about a horizontally disposed pivot 78 effecting reciprocation of the upper cutter assembly 62 which has one end pivotally carried by pin 80 secured to the lever 76 and the other end pivotally mounted to the frame of the cutting machine 14 by the pivotal link 82, as seen best in FIG. 6. The drive means for the lower blade assembly 64 as seen best in FIG. 5, is essentially the same as the means for driving the upper assembly 62, with the exception that the lower blade assembly 64 is reciprocated at right angles to the reciprocation of the upper blade assembly 62. It will therefore be seen that the lower blade assembly 64 is driven by an electric motor 84 driving a flywheel 86 provided with an eccentric wrist pin 88 driving crank 90 which effects oscillation of the lever member 92 about the pivotal axis provided by the pin 94 carried by the frame of the cutting machine 14. A pin 96 secured to the lever 92, through suitable bearing member 98 secured to the peripheral frame means of the lower cutter assembly 64, effect reciprocation thereof. As with the upper cutter assembly 62, it will be seen that the lower cutter assembly 64 is pivotally secured to the frame of the cutting machine 14 by the pivotal link 100.

The blades 66 are provided with upwardly disposed cutting edges extending substantially the entire length of the blade, which cutting edge is preferably serrated as seen best in FIG. 6. In FIG. 4 it will be seen that the upper blade assembly 62 includes 12 cutter blades 66 wherein six blades are disposed to one side of the vertical divider 60 and the remaining six blades are disposed on the opposite side of the vertical divider 60, immediately therebeneath. Furthermore, to assist in artificially imparting to the salad greens the appearance of having been manually cut and torn, i.e. a somewhat nonuniform cut, the six cutter blades 66 on each side of the divider 60 are disposed in pairs with the centrally disposed pair of blades being spaced further apart than the pairs of blades disposed to either side of the centrally disposed pair of blades 66. The lower blade assembly 64 is preferably provided with a plurality of blades 66, which in the embodiment illustrated comprises five blades, generally equidistantly spaced and disposed beneath the paired blades 66 of the upper blade assembly 62. It will thus be appreciated that the aforedescribed orientation of the blades effects a rather "random" or nonuniform segmenting of salad greens falling downwardly therethrough under the influence of gravity.

As seen best in FIG. 5, segmented salad greens dropping downwardly from the lower cutter assembly 64 is acted upon by the spray wash means 15 having a spray nozzle means 102, connected by suitable piping to a source of potable water under pressure, whereby the segmented salad greens are effectively pressure washed and collected on a spray wash chute 104 whereupon they advance downwardly under the combined influence of gravity and the sluicing affect of spray water discharging from the means 102. The thoroughly wetted washed segmented salad greens discharge from the spray wash chute 104 into a complementary chute 106 comprising the infeed hopper of the primary drain conveyor 16 which is provided with a continuous belt 108 provided with spaced perforations 110 along its entire length and width. The belt 108 is journaled about at least a pair of guide and tensioning rollers 112, one of which may be seen in FIG. 5, and wherein the companion roller 112, not shown, at the upper end of the primary drain conveyor 16 is driven by a motor-gear reduction unit 114 as seen in FIG. 1. From the foregoing it will be appreciated that the majority of the water sprayed on the segmented salad greens, together with the foreign matter entrained therein, will drain therefrom during the time it takes to convey the washed segmented salad greens from the infeed end to the outfeed discharge end of the conveyor belt 108.

Figure 7:
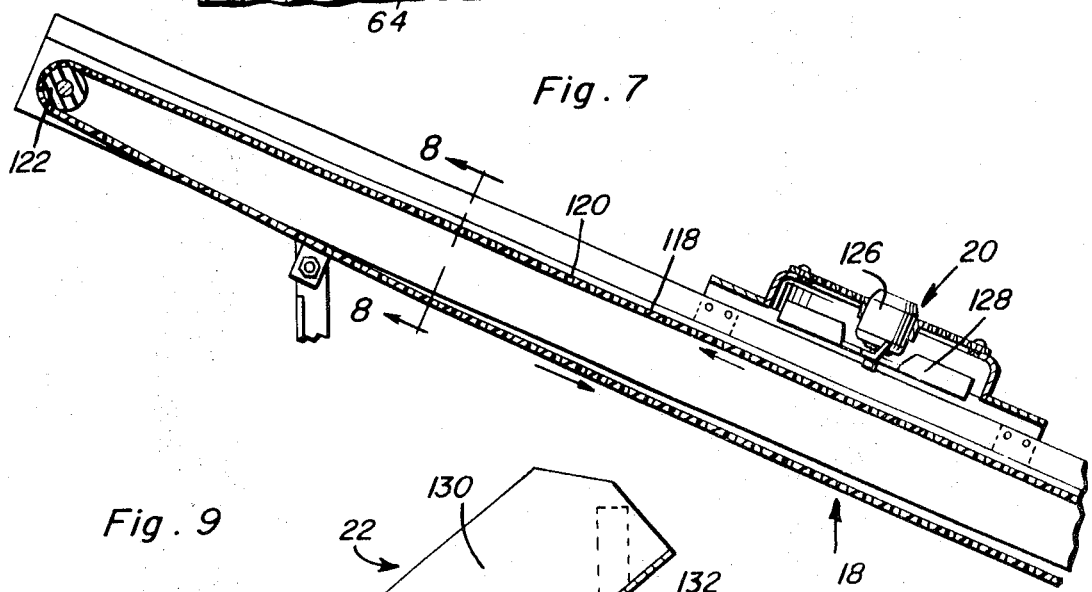
FIG. 7 is a vertical longitudinal cross-sectional view of the secondary drain conveyor of the apparatus of FIG. 1.

The segmented, washed, partially drained salad greens discharging from the primary drain conveyor 16, as schematically 44 in FIG. 1 by the arrow at the uppermost end of the primary drain conveyor 16, drop by gravity onto the secondary drain conveyor 18 provided with an infeed hopper means 116, and onto a continuous conveyor belt 118 having a multitude of perforations as at 120, which belt 118 is entrained about at least a plurality of guide and tensioning rollers 122, one of which may be seen in FIG. 7. As seen in FIG. 1, the uppermost tensioning and guide roller 122 is power driven by a motor-gear reduction drive unit 124. From the foregoing it will 58 appreciated that the partially drained segmented washed salad greens traveling upwardly along the secondary drain conveyor 18 drain still further and in their travel are subjected to further drying, i.e., removal of excess wash water, not drying of the greens per se, by the drying fan means 20 disposed in overlying relation to the conveyor belt 118. As will be appreciated for a consideration of FIG. 7, the fan means 20 includes a motor 126 driving a multivaned fan 128 for supplying low-pressure, high velocity air to the surface of the conveyor belt 118, and accordingly the segmented salad greens passing therealong.

Figure 9:
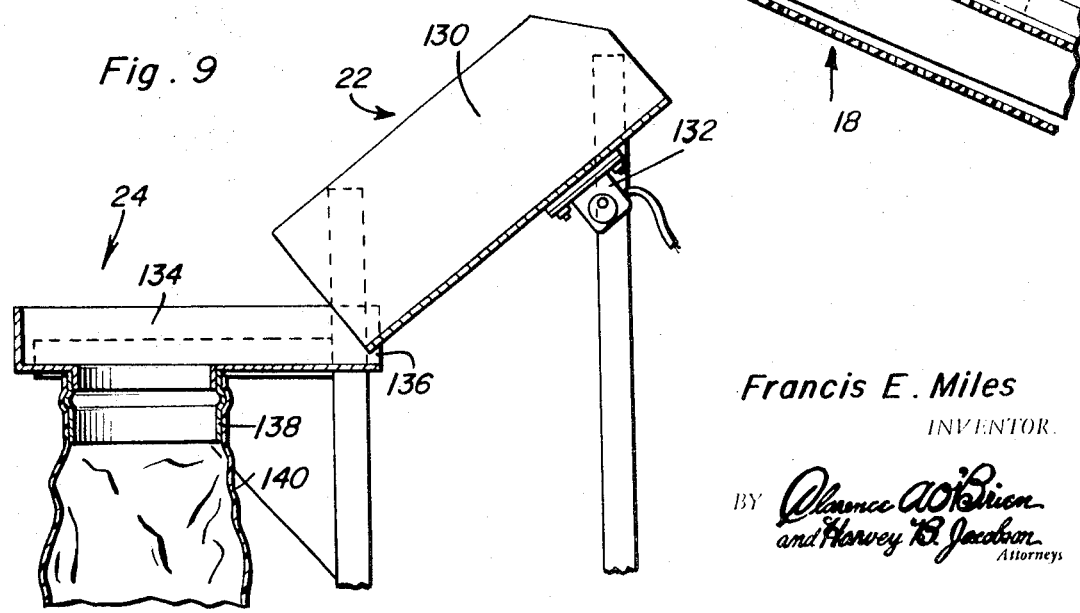
FIG. 9 is a longitudinal vertical cross-sectional view of the bag filling portion of the apparatus of FIG. 1.

Returning once again to FIG. 1 and as schematically indicated by the arrow at the upper end of the secondary drain conveyor 18, the "dried" segmented washed salad greens drop by gravity onto the vibrating hopper means 22 which as best seen in FIG. 9, comprise an imperforate downwardly inclined chute 130 having a vibratory means 132 secured thereto for removing any remaining excess moisture from the segmented salad greens. The filling station 24 comprises an upwardly opening three-sided trough 134 having the open end 136 thereof inclined slightly downwardly so as to insure that excess water, which may reach the vibratory chute 130, drains off the chute 134 without reaching the downwardly depending bag-receiving ring 138 about which is retained a plastic bag 140. The bag 140 comprises an exemplary type of receptacle for hermetically packaging the segmented, washed, dried salad greens in an inert atmosphere. The bags 140 preferably rest on a scale 142 an upon being filled with an appropriate weight of segmented salad greens the bag 140 is removed from the filling neck 138 and transferred to the packing station 26 where it is preferably placed within master carton such as the carton 144. At this point a vacuum pump means 146 connected by means of vacuum line 148, evacuating control valve means 150, backfill valve means 152 and tubing 154, placed within the bag 140, is utilized by appropriate positioning of the valve means 150 and 152 to evacuate interstitial air from within the filled bag 140, the neck of which is manually gathered about the tubing 154. Subsequently, by appropriate manipulation of the valve means 150 and 152 the evacuated bag 140 in the carton 144 is backfilled with a suitable inert gas, i.e. nitrogen, through the conduit 156, valve 152 and conduit 154, after which the neck of the bag is twist tied during the simultaneous withdrawal of the conduit 154 from within the bag. During the period of backfilling of the bags the valve means 150 vents the vacuum pump 146 to atmosphere.

Turning now in greater detail to the process for the preparation of a tossed salad mix from salad greens in accordance with the present invention, headed salad greens, i.e., head lettuce, chicory, etc. have their cores removed by utilization of the coring machine 10. Other salad greens, generally unheaded salad greens, i.e., romaine lettuce, etc. have guard leaves removed, are trimmed and have their butts cut off by hand operation such as may be preformed on the cutting table 54. The salad greens so prepared are placed on the conveyor 50 in relative proportion to the proportional amount of each different type of salad green desired in the final package. The cored headed salad greens are generally placed on the open run of the conveyor 50 and the unheaded salad greens generally placed on the conveyor 50 through the apertures 56 in the guard member 52 which assists in confining and guiding these leafy salad greens to the cutting machine 14. The salad greens discharge from the conveyor 50 into the hopper 58 of the cutting machine 14 whereupon they are acted upon by the reciprocating upper and lower cutter assemblies 62 and 64, respectively, whereby the salad greens are somewhat "ramdonly" divided into segments in a manner whereby the unequal spacing of the blades 66 in the upper cutter assembly 62, as well as the normally disposed blades of the lower cutter assembly 64, as well as the serrations of the blades 66, cooperate to sever the salad greens into bite-size segments having artificially imparted thereto the appearance of having been manually cut and torn as is generally considered most desirable for the severing of salad greens during the preparation of tossed salad.

The randomly segmented salad greens dropping from beneath the cutter assemblies pass through a pressurized spray of water, which effectively washes the segments, removes foreign matter, and the washed segments are sluiced downwardly into the infeed hopper 106 of the primary drain conveyor means 16. A solution of sodium bisulfite at the strength of one-half of 1 percent is added to the spray wash to neutralize mineral content of cut edges of the segments. During their travel upwardly on the belt 108 the major proportion of the wash water drains off the segments under the influence of both the inclination of the conveyor and the perforations 110 in the belt 108. The washed, partially drained segmented salad greens discharge from the primary drain conveyor means 16 onto the lower end of the secondary drain conveyor means 18 and in the initial portion of their travel upwardly therealong are subjected to further draining followed by final "drying" of excess wash water from the surface of the segments under the influence of the flow of air produced by the drying fan means 20.

The washed and dried segmented salad greens, which it will be appreciated have been proportionately intermixed during washing, draining and drying thereof in relation to their placement on the conveyor 50, discharge from the upper end of the secondary drain conveyor means 18 onto the vibrating hopper 130 where they have further moisture removed therefrom and are placed in the plastic bag 140, or the like, supported beneath the filling platform 134.

The filled, but still open bags 140 are then manually conveyed to a master carton whereupon interstitial air is evacuated from the filled bags 140 by means of the vacuum pump 146 acting through the conduit 148, valve means 150, 152 and tubing 154. During such evacuation the valve means 150 is closed to atmosphere and the valve means 152 is positioned to preclude passage of inert gas from the conduit 156 into the tubing 154. After a sufficient time refrigeration whereupon, elapsed for evacuation of the air from the interstices between the salad green segments, the valve means 150 is positioned to communicate the vacuum pump 146 with atmosphere and the valve means 152 is positioned to communicate the conduit 156, connected to a source of inert gas under pressure, preferably dry nitrogen, with the tubing 154 whereby the insert gas from the source, not shown, effectively backfills the interstices. The tubing 154 is then withdrawn together with simultaneous sealing of the neck of the bag such as by twisting and clip sealing. The master cartons are then placed under refrigeration whereupon, after sufficient cooling, they are ready for shipment.

While it may at first appear, from a consideration of the foregoing, that the process of the present invention can be readily carried forth manually, such is not really the case. Accordingly, it should be appreciated that salad greens cannot as a practical matter be manually cored, trimmed, segmented, washed, drained, dried and inert atmosphere packaged sufficiently rapidly to sufficiently arrest deterioration thereof whereby prepared salad mixes can be prepared in commercial quantities and still be provided with sufficient "shelf-life" to permit distribution thereof to restaurants and other food service facilities through normal channels of distribution. Therefore, and more specifically, it will be appreciated that the reduction of the time elapsed between severing of the salad greens into segments and inert atmosphere packaging thereof is significant in eliminating oxidizing discoloration of the salad green segments, and particularly the severed edges thereof.

I claim:

1. Apparatus for the preparation of a tossed salad mix from salad greens which comprises in combination:
   a. means for severing the cores, guard leaves and butts from the harvested portion of salad greens;
   b. conveyor means for transporting the greens to a severing means;
   c. means for severing the greens into randomly sized segments as customarily provided for the preparation of tosses salad, said severing means including at least a pair of power-operated reciprocal cutter assemblies, each of said cutter assemblies including a plurality of parallelly disposed spaced cutter blades, one of said at least a pair of cutter assemblies having the cutter blades disposed in nonuniformly spaced pairs, another of said at least a pair of cutter assemblies having the cutter blades generally uniformly spaced and disposed at generally right angles to the cutter blades of said one of said at least a pair of cutter assemblies;
   d. means for water spray washing segmented greens discharging form said severing means;
   e. inclined perforate conveyor means for draining wash water from the segmented greens;
   f. means overlying said inclined perforate conveyor means for drying surface adherent wash water from the segmented greens, said drying means comprising a power-operated fan means for supplying a forced draft of air to the segmented greens;
   g. vibratory means for receiving dried segmented greens from said inclined perforate conveyor means and selectively conveying the greens to a packaging station means; and
   h. means for hermetically inert atmosphere packaging of the segmented greens.

2. The combination of claim 1 wherein said means for severing the cores comprises a power-operated coring means including a motor driven annular coring cutter, and cutter guard means for normally covering said coring cutter, said cutter guard means including an apertured plate normally biased into cutter covering position, said apertured plate being retractable into cutter uncovering position under the influence of a head of salad greens being urged thereagainst.

3. The combination of claim 1 wherein said conveyor means of (*b*comprises a generally horizontally disposed endless conveyor belt including guard means for dividing the conveyor belt into a pair of runs, one of said pair of runs being open, the other of said pair of runs being generally enclosed by said guard means, said guard means including an opening therein for placement of salad greens on said generally enclosed run.

4. The combination of claim 1 wherein said means for severing the greens into randomly sized segments includes a pair of cutter assemblies, and said cutter blades are provided with serrated cutting edges.

5. The combination of claim 1 wherein said inclined perforate conveyor means includes a pair of conveyors providing primary and secondary drain conveyors, said primary drain conveyor discharging conveyed salad greens onto said secondary conveyor, and said secondary conveyor being provided with the drying means of (*f*).